(12) United States Patent
Dau (10) Patent No.: US 6,253,607 B1
(45) Date of Patent: Jul. 3, 2001

(54) FILL LEVEL MEASURING SYSTEM

(76) Inventor: Hans-Jorg Dau, Segeberger Strasse 113, 23617 Stockelsdorf (DE)

( * ) Notice: Subject to any disclaimer, the term of this patent is extended or adjusted under 35 U.S.C. 154(b) by 0 days.

(21) Appl. No.: 09/076,742

(22) Filed: May 13, 1998

(30) Foreign Application Priority Data

May 14, 1997 (DE) ............................................. 197 20 125

(51) Int. Cl.[7] .............................. G01F 23/00; G01F 23/30
(52) U.S. Cl. .......................................... 73/290 R; 73/291
(58) Field of Search ................................. 73/149, 290 R, 73/291, 155, 229, 119, 861, 194

(56) References Cited

U.S. PATENT DOCUMENTS

| | | | |
|---|---|---|---|
| 3,739,635 | * | 6/1973 | Stuart ...................................... 73/194 |
| 4,140,013 | * | 2/1979 | Hunger ................................... 73/229 |
| 4,290,305 | * | 9/1981 | Gibson et al. .......................... 73/155 |
| 4,499,876 | * | 2/1985 | Yamamoto .......................... 73/119 A |
| 4,838,295 | * | 6/1989 | Smith et al. ....................... 73/861.02 |
| 5,272,918 | * | 12/1993 | Gaston et al. ..................... 73/290 R |
| 6,065,335 | * | 5/2000 | Denz et al. ............................. 73/291 |

FOREIGN PATENT DOCUMENTS

| | | |
|---|---|---|
| 3326719 C2 | 1/1984 | (DE) . |
| 3825630 C2 | 2/1990 | (DE) . |
| 19634813 A1 | 3/1997 | (DE) . |
| 19634813 * | 3/1997 | (DE) . |

* cited by examiner

*Primary Examiner*—Hezron Williams
*Assistant Examiner*—Katina M Wilson
(74) *Attorney, Agent, or Firm*—McGuireWoods LLP (57) ABSTRACT

A fill level measuring system for the liquid content of a tank, with a fill level sensor (10, 50) for generating a signal proportional to the height of a point of the liquid level, an additional volume flow sensor (14, 52, 56) for generating a signal proportional to the inflow or outflow, and an indicating instrument (28).

To compensate for systematic errors with high-frequency portions, for example due to air turbulence in the case of an airplane, and low-frequency portions, for example due to position changes (climb/descent; upward run/downward run for a motor vehicle) it is proposed to direct the signal of the fill level sensor (10) through a low-pass filter (12) and the signal of the volume flow sensor (14) through a high-pass filter (18), and to sum up both signals before the indicating instrument (28).

12 Claims, 8 Drawing Sheets

FILL LEVEL MEASURING SYSTEM

BACKGROUND OF THE INVENTION

The invention relates to a fill level measuring system for the liquid content of a tank (tank indicator), with a fill level sensor for generating a signal proportional to the height of a point of the liquid level, an additional volume flow sensor for generating a signal proportional to the inflow or outflow, and an indicating element.

In the numerous fields of technology there is a need to determine the liquid content of a tank. While it is possible to determine the weight in the case of smaller tanks, a level measurement is generally carried out for larger tanks. For this purpose, fill level sensors are used that generate a signal proportional to the height of a point of the liquid level. Such fill level sensors for a level measurement are typically lever float sensors in which a float is connected via a lever with a potentiometer, or rather capacitors that are designed in tubular form, for example, and a allow a capacitive fill level measurement in that the liquid to be measured acts as a dielectric.

In numerous applications, however, the liquid surface of the liquid is exposed in the tank to high-frequency or low-frequency excitation, in such a way that determining the liquid level with the precision to be required for various applications becomes impossible with fill level sensors. This applies in particular to the determining of fuel supply quantities via a level measurement of the fuel in the tank of a vehicle. This includes combustion-engine-propelled land vehicles as well airplanes or ships. The level of the fuel liquid in supply tanks in all vehicles is subject to constant fluctuations due to position and acceleration changes. An indicator aligned undamped on the given level thus fluctuates considerably and leads to problems in particular where overestimating the remaining fuel quantity may lead to dangerous situations, in the case of motor-driven airplanes.

Since the fuel tank in most cases is solidly built into the respective vehicle, into an airplane for example, the accelerations and position changes of the respective vehicle, in particular an airplane, and thus also those of the tank have a direct effect as input values on the movement of the fluid. Specifically in the case of airplanes, high-frequency disturbances of the liquid surface can be observed that are attributable to air turbulence, as well as low-frequency disturbances that are brought about, for example, by lasting position changes of the vehicle, in climb or the like, for example.

Figure 7:
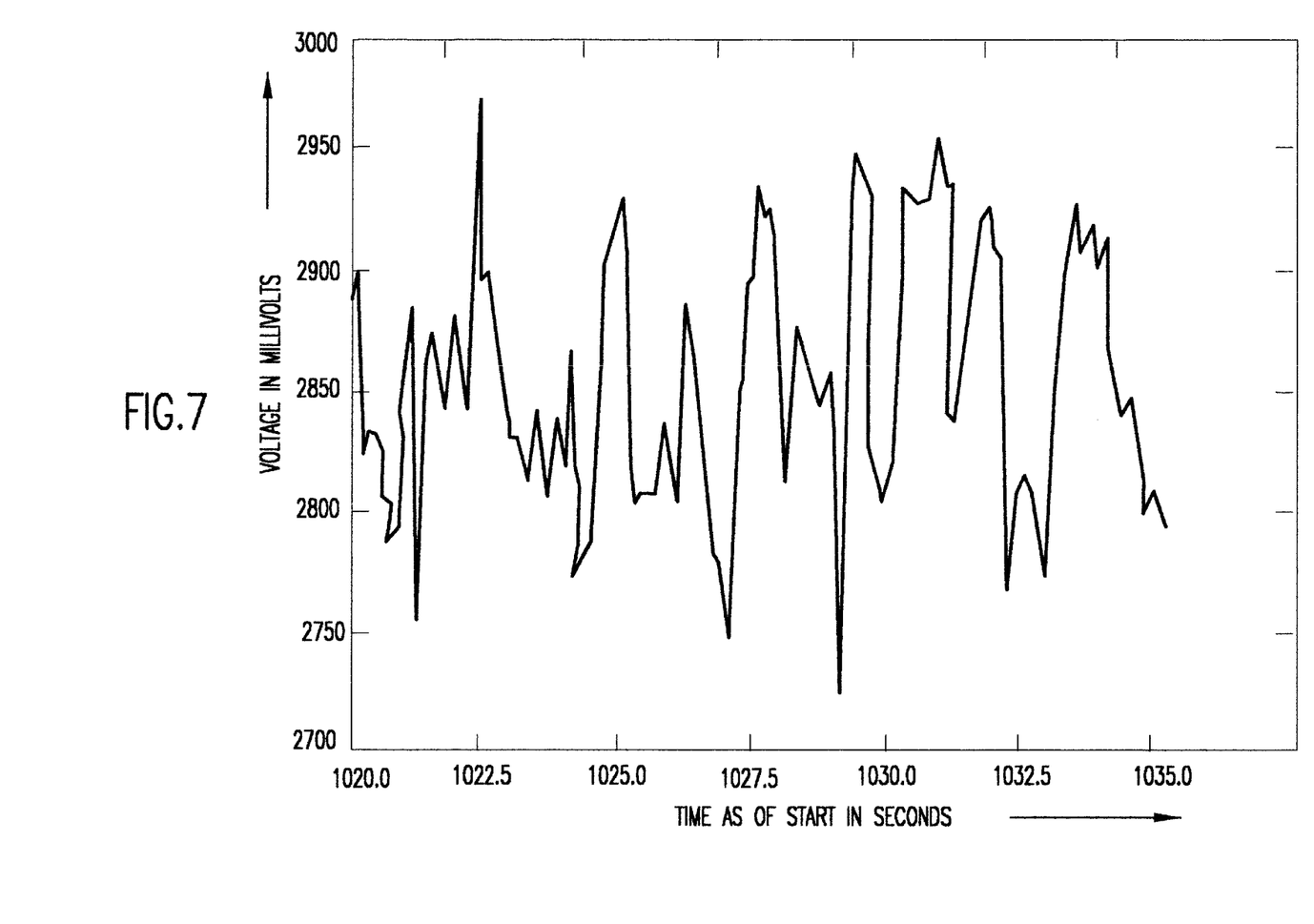

FIG. 7 shows as an example the fill level sensor voltage of a typical float lever sensor of a small airplane during a horizontal flight of roughly 15 seconds. The illustration clearly shows high-frequency disturbances with a frequency of approx. 1 Hz that are excited by air turbulence. The fill level sensor voltage curve shows amplitudes of up to ±125 mV, which corresponds to a fluctuation of ±1.3 1 for the model of airplane examined. In flights in turbulent weather situations, fluctuations of ±10 1 to ±15 1 were observed in the fuel gauge, for an approx. 75 1 total fuel volume of the small airplane observed.

Figure 8:
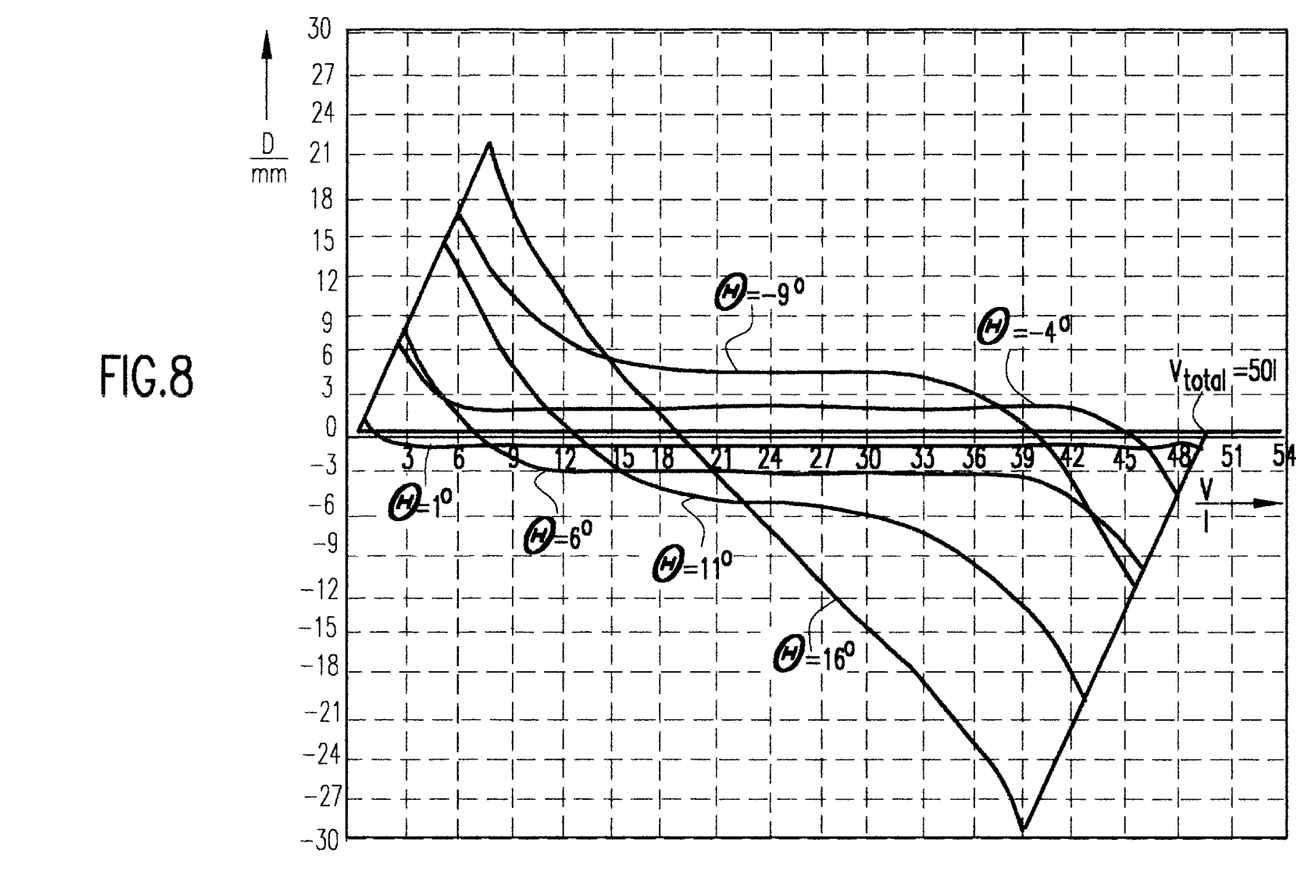

FIG. 8 shows typical steady deviations that result from very lengthy, extremely low-frequency flight position changes (e.g. steady climb, descent or slow flights). The formation of such deviations depends first and foremost on the tank's geometry, the mounting site of the fill level sensor, the momentary fuel volume and the tank's angle of inclination. FIG. 8 shows the absolute deviation of the scanning height depending on the airplane's longitudinal angle of orientation and the tank content. For example, one can see that with a 16° longitudinal angle of orientation of the airplane and an approx. 39 1 momentary tank volume for this tank, a 30 mm error of the float excursion occurs, tantamount to an error volume of approx. 11 1 for the geometry of this specific tank. For this reason, the fuel quantity is overestimated by approx. 27%. This can lead to a significant miscalculation by the pilot with respect to the airplane's range available to him. Similar systematic errors result in the case of vehicles on an upward run or downward run, for example.

A fill level indicator is known from DE 38 25 630 C2, in which the conventional fill level measuring sensor, designated there as a static transmitter, is supplemented by a consumption measuring system that determines the momentary fuel consumption based on injection signals of a fuel injection system. In this connection, the tank indicator is essentially controlled by the integrated volume flow which is subtracted from a supply quantity of the fuel determined at specific points in time by the static transmitter. Instead of using the injection signals to determine the fuel consumption, in general a flowmeter is also proposed, and hence a volume flow sensor in the wording of the patent application.

A considerable disadvantage in the fill level measuring system proposed in the form of 38 25 630 C2 according to the state of the art is the fact that the volume flow sensor must be of high quality in order to deliver utilizable results. Since linearity deviations of the volume flow sensor are integrated, and thus lead to very high absolute deviations of the tank indication as time goes on, only volume flow sensors with a linearity error in the low single-digit percent range are acceptable. Such volume flow sensors are very costly and thus are out of the question for use in vehicles and small airplanes, motor boats, etc.

The invention is thus based on the technical problem of improving a fill level measuring system of the generic type in such a way that comparably inexpensive components with comparably high equipment-specific deviations can be used as fill level sensors and volume flow sensor, and in spite of this a precise tank indication is made possible. In this connection, high-frequency disturbances should continue to be eliminated in such a way that a steady tank indication is ensured. Furthermore, low-frequency disturbances, such as lengthy position changes of the airplane with lesser angular frequency (climb/descent) are considerably attenuated with respect to their effects on the measuring result, without any lag error being generated due to the considerable attenuation.

The solution of the technical problem is characterized in that in a generic fill level measuring system, the signal of the fill level sensor is directed through a low-pass filter and the signal of the volume flow sensor is directed through a high-pass filter, and that both signals are summed up before the indicating instrument. In this connection, a preferred and advantageous dimensioning is for the cut-off frequency (time constant) of the low-pass filter to be essentially identical to the cut-off frequency (time constant) of the high-pass filter. With such a dimensioning it can be achieved that low-frequency disturbances are eliminated by designing the low-pass filter accordingly, in connection with which, lag errors occurring with the extreme dimensioning of the low-pass filter are compensated by the signal portion supplied to the high-pass filter. The time constants resulting during typical applications are so great that conventional analog components, in particular capacitors, attain sizes and weights that are unacceptable. According to a preferred form of construction it is thus provided for that the filters are digitally constructed. In this connection, it is particularly preferred that when using the invention's fill level measuring system for indicator systems in airplanes, the time constants of the filters are able to be optimized with respect to a typical flight conduct. Thus, for example, a training airplane that often circles and flies start/landing exercises can be optimized with respect to its fill level measuring system differently than an airplane intended for lengthy cruising.

There are considerable delays after starting the fill level measuring system according to the invention due to the considerable damping of the low-pass. For this reason, it may be provided for that the low-pass filter is able to be bridged briefly starting compensation, in order to quickly provide a first reading to the pilot or other user of a vehicle.

The planned supplementary filtering (low-pass filtering for the signal of the fill level sensor/high-pass filtering for the signal of the volume flow sensor) can also be achieved indirectly in that the signal of the fill level sensor is used as a support value for a gauging filter that has an integrator adjacent to the input of which is the difference from the signal generated by the volume flow sensor and a returned correction signal, in connection with which the latter signal is proportional to the difference between the momentary fill level sensor signal as a support value and the output of the integrator as an estimated value.

Such a gauging filter also leads to a low-pass filtering of the fill level sensor's signal with low cut-off frequency (high time constant), in connection with which a systematically resulting lag error is compensated by a supporting of the filter with the volume flow sensor signal. In this connection, the supporting causes a high-pass-like filtering of the volume flow sensor signal.

It is particularly advantageous to use as fill level sensor a basically known sensor that has a potentiometer and a float attached to a lever.

In particular the volume flow sensor may be an inexpensive turbine wheel meter or a hot-wire anemometer.

Further preferred forms of construction of the invention can be inferred from the subclaims.

Further details of the invention result from the drawings described below. The drawings show.

Figure 1:
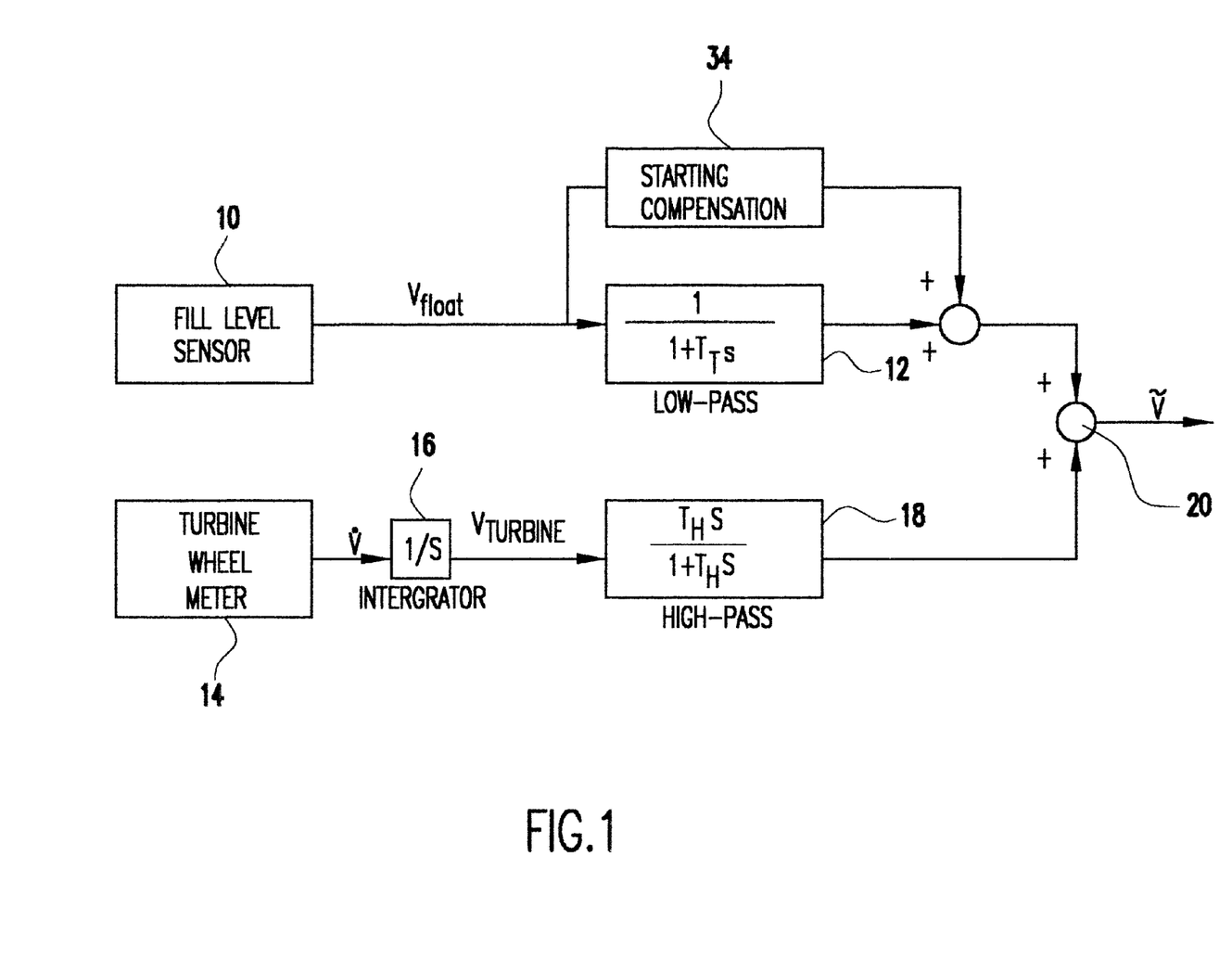
FIG. 1—a fill level measuring system according to the invention with a supplementary filter, FIG. 2—a schematic illustration of a digital execution, FIG. 3—a table of the errors resulting from a supplementary filter according to the invention according to FIG. 1, FIG. 4—a perspective view of a small airplane with built-in fill level measuring system according to the invention, FIG. 5—an alternative form of construction of a fill level measuring system according to the invention according to FIG. 1 with a gauging filter, FIG. 6—a table of the errors resulting from a form of construction according to FIG. 5, FIG. 7—an illustration, already discussed in the description introduction, of high-frequency disturbances of a lever float sensor, and FIG. 8—an illustration, already discussed in the description introduction, of resulting systematic errors of a tank indication of a small airplane in the case of position changes around the lateral axis (variation of the longitudinal angle).

FIG. 1 shows a fill level measuring system according to the invention with a basically known fill level sensor 10. The fill level sensor generates a signal which is proportional to the height of a point of the liquid level in the tank and from which, with the tank's geometry known, a measured volume $V_{float}$ is derived. This signal is directed via a low-pass filter 12 with a large time constant $T_T$.

Parallel to this, a turbine wheel meter 14 is provided that generates a volume flow signal V. The volume flow is integrated in an integrator 16 into a signal $V_{turbine}$. This signal is directed via a high-pass filter 18 the time constant $T_H$ of which is essentially identical to the time constant $T_T$ of the low-pass filter.

Both signals are summed up at a nodal point 20 and indicated on an indicating instrument not shown.

The constants $T_T$ and $T_H$ are large enough that an execution with analog components, such as capacitors in particular, would lead to large, voluminous and heavy apparatuses.

Figure 2:
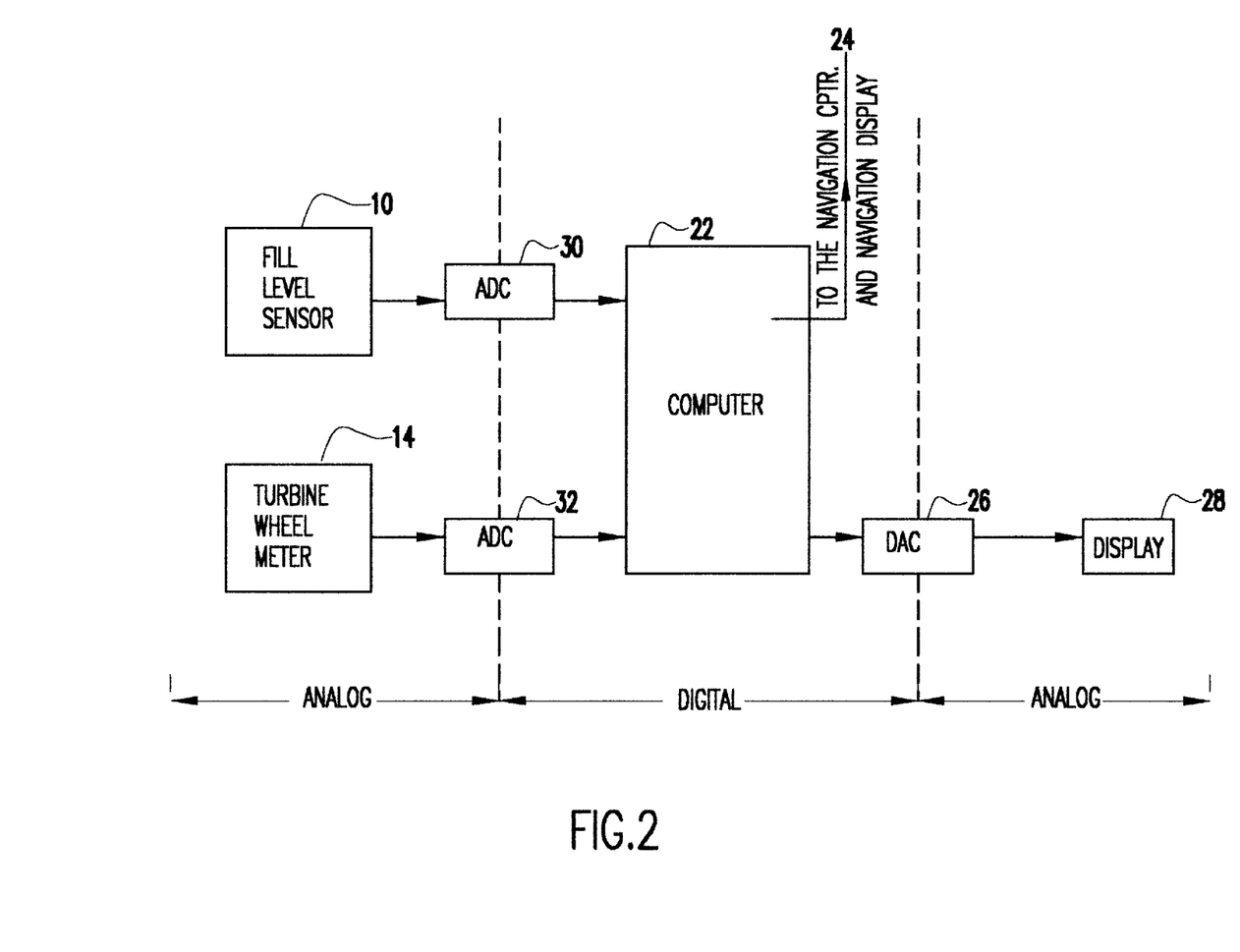

For this reason, FIG. 2 shows that it is preferably provided for to carry out the filtering digitally by means of a computer 22. In this connection, an output 24 can be provided for at which the generated digital values are immediately further processed and, for example, are displayed in what is referred to as a primary flight display, in connection with which derived values can be generated, such as the maximum range of the airplane or the like, for example.

As an alternative, it can be provided for to generate by means of a digital/analog converter 26 an analog signal that is displayed in a conventional display 28, for example a cross-coil instrument.

Analog/digital converters 30 and 32 are provided in order to digitalize the signals supplied by the fill level sensor and the turbine wheel meter 14.

FIG. 1 furthermore shows a bridging branch 34 designated as "starting compensation" and by means of which the low-pass filter 12 can be bridged. This is provided in order to relieve the driver, pilot or the like of the feeling, after starting the instrument panel, the avionics or the like, that the indicator is broken. Without such a starting compensation, because of the large time constant $T_T$ it would take a comparably long time until an indicator 28 (FIG. 2) would display a realistic value.

To prevent false starting values of the indicator because a vehicle or airplane is on an incline, it can be provided for to carry out a delayed mean value formation that can be controlled if necessary by other vertical (pendulum) or position detecting sensors (artificial horizon).

Figure 3:
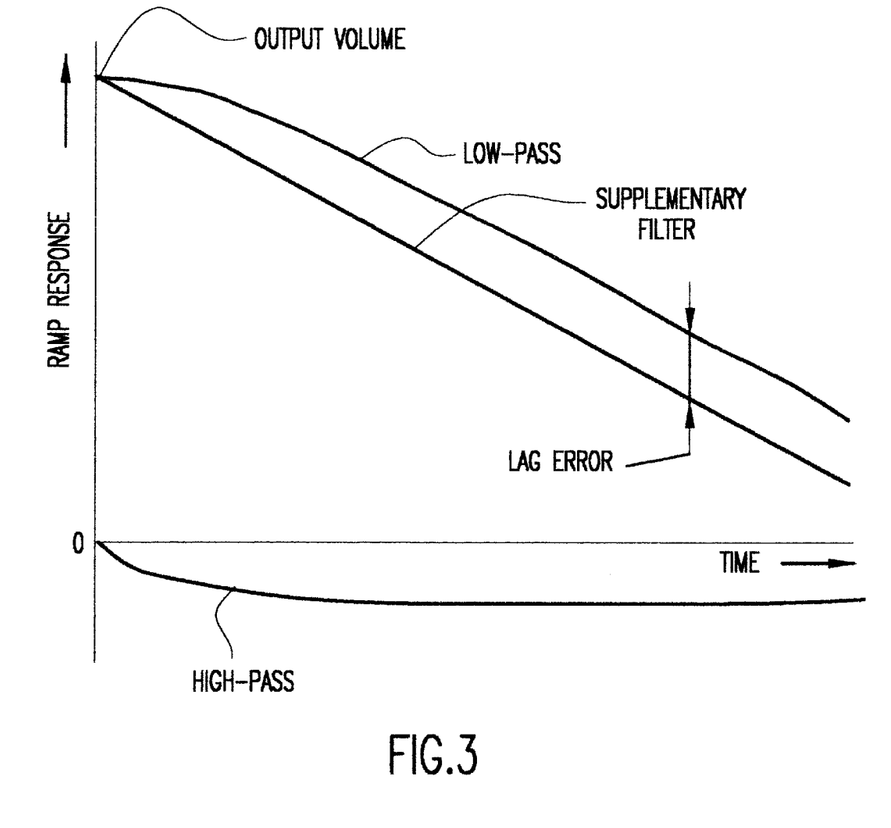

FIG. 3 shows the systematic errors and compensation for them by means of an output volume that is continuously reduced. It can be seen that the signal subjected to a low-pass filtering with low cut-off frequency shows a lag error. This is precisely compensated by the high-frequency portions delivered by the high-pass filter 18 when the low-pass filter 12 and the high-pass filter 18 are suitably dimensioned.

Figure 4:
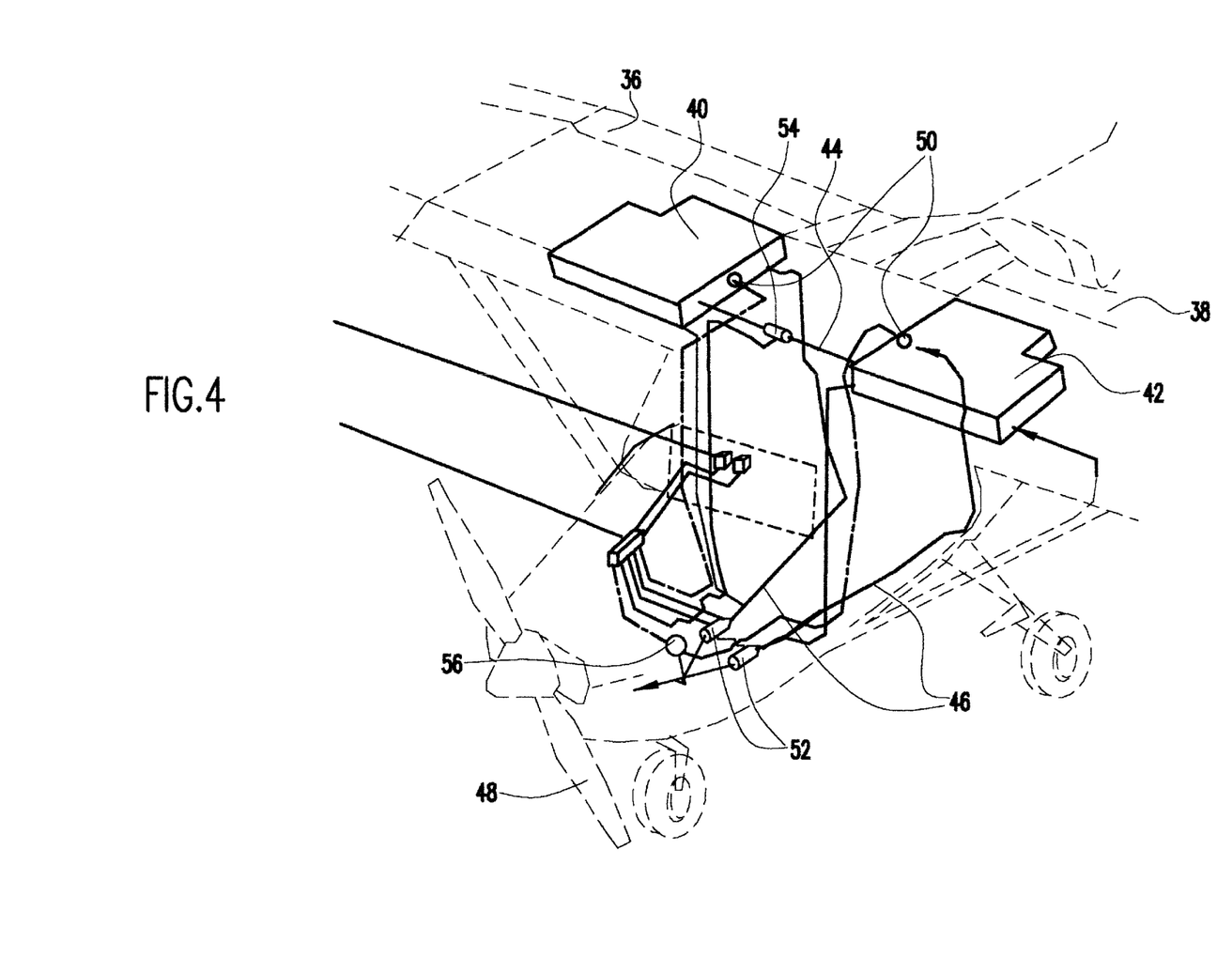

FIG. 4 shows a mounting possibility in a small airplane. The airplane designed as a monoplane with high-set wings has two tanks which are 40 and 42 arranged in the airfoils 36 and 38 and are joined together via a balancing pipe 44. From the tanks 40 and 42, the fuel is forwarded via fuel lines 46 to a motor, not shown, that drives a propeller 48. Standard fill level sensors 50 correspond to the fill level sensors 10 in FIG. 1. In addition, two turbine wheel meters 52 are inserted as volume flow sensors into the fuel lines 46. The turbine wheel meters 52 correspond to the turbine wheel meters 14 according to FIG. 1. To be able to detect fuel flows via the balancing pipes 44, an additional volume flow sensor 54 is provided that can be a hot-wire anemometer, for example. By means of a fuel selection lever, 56, the airplane's pilot can empty the port tank 42, the starboard tank 40 or both.

Figure 5:
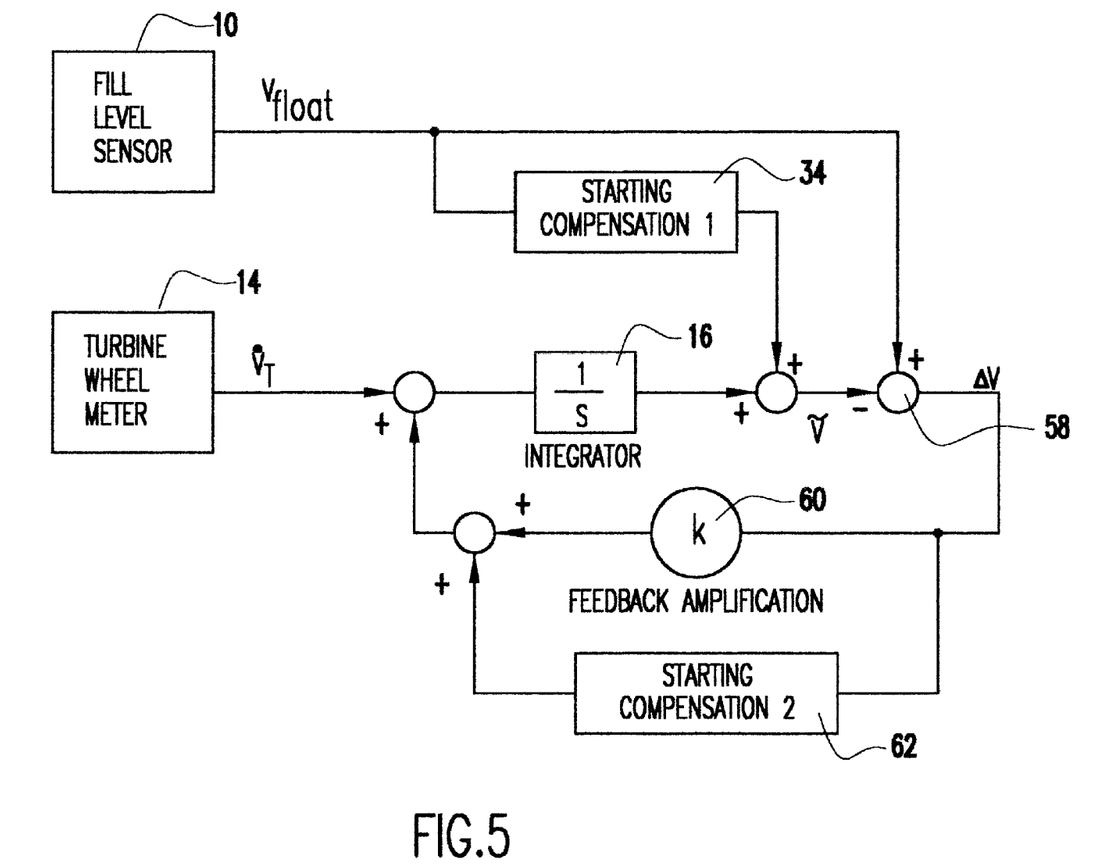

FIG. 5 shows a fill level measuring system according to the invention, in which the signal $V_{float}$ supplied by the fill level sensor and the signal $V_T$ supplied by the turbine wheel meter is processed by means of a gauging filter and thus, in the final result, they are filtered in similar manner as by means of a supplementary filter, as shown in FIG. 1.

Figure 6:
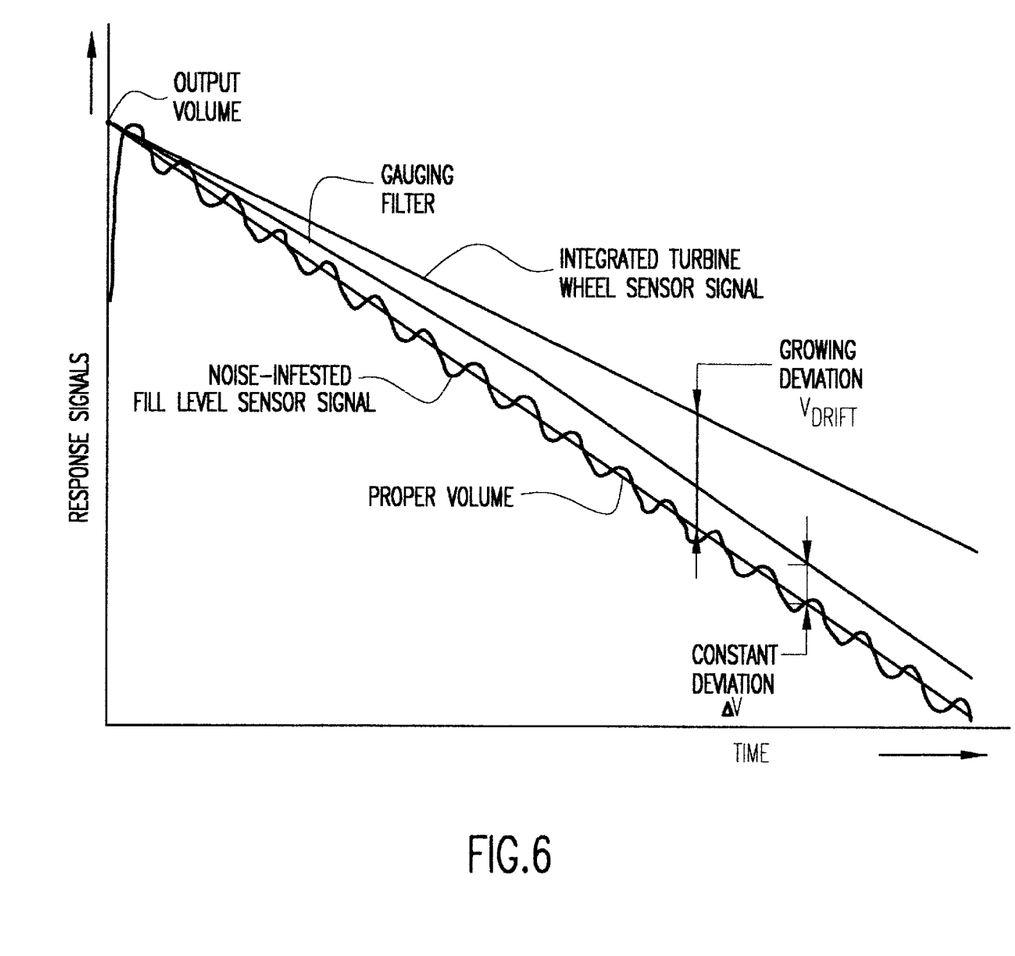

In the "fuel consumption" process, the filter model consists of an integrator 16 that integrates the signal $V_T$ supplied by the volume flow sensor/turbine wheel meter 14 into the consumed volume. If one assumes that the fuel system is in leakage-free condition and neglects the fuel losses due to evaporation, the two measured value volumes and the volume flow behave regressively with each other. The linearity deviations of the turbine wheel meter 14 become noticeable in the integrated volume in a deviation subject to drift, as shown in FIG. 6. The value at the output of the integrator is designated as estimated value V. The estimated value is subtracted at a nodal point 58 from the available measured value of the fill level sensor 10 $V_{float}$, and the resulting deviation $\Delta V$ is fed back via a feedback amplification 60 to the input of the filter (integrator). Precisely as with the supplementary filtering shown in FIG. 1, the signal $V_{float}$ measured by fill level sensor is composed of the actual volume V and a noise portion $V_{noise}$ and the volume $V_T$ integrated by the turbine wheel meter consists of the actual volume V and the aforementioned drift portion $V_{drift}$.

A starting compensation 34 carries out a similar task as with the supplementary filter shown in FIG. 1. In addition, a second starting compensation 62 is shown with which the amplification factor K of the feedback amplification 60 can be modified. To also be able to suppress the very low-frequency disturbance portions in the fill level sensor signal, the feedback amplification must be chosen very small. This results in an extremely low-pass behavior of the entire filter, which leads after starting to very long waits until the indicator needle of an indicator system (28 in FIG. 2, for example) reached its static final value. This step is accelerated by the compensating circuit, in such a way that the indicator needle already indicates the actual fuel volume approx. three to four seconds after starting the system.

FIG. 6 shows that the portion $V_{drift}$, that is, the error of the signal present after the integrator 16 grows with time, because the error of the turbine wheel meter 14 is integrated.

$V_{drift}$ is minimized to a constant deviation $\Delta V$ with the gauging filter shown in FIG. 5.

The design according to the invention of a fill level measuring system makes it possible for the first time to use inexpensive components that are saddled with accordingly high errors, for the fill level sensor and the volume flow sensor, in particular in the form of a turbine wheel meter, without delivering an unacceptably imprecise measuring result. In addition, both high-frequency and low-frequency disturbances are satisfactorily filtered out, in such a way that a reliable tank indication is available in particular for vehicles that are exposed to considerable changes in acceleration or position.

| Reference number list | |
|---|---|
| 10 | fill level sensor |
| 12 | low-pass filter |
| 14 | volume flow sensor, turbine wheel meter |
| 16 | integrator |
| 18 | high-pass filter |
| 20 | nodal point |
| 22 | computer |
| 24 | output (of 22) |
| 26 | digital/analog converter |
| 28 | indicating instrument |
| 30 | analog/digital converter |
| 32 | analog/digital converter |
| 34 | starting compensation |
| 36 | starboard airfoil |
| 38 | port airfoil |
| 40 | starboard tank |
| 42 | port tank |
| 44 | overflow line |
| 46 | fuel lines |
| 48 | propeller |
| 50 | fill level sensors |
| 52 | volume flow sensors |
| 54 | volume flow sensor |
| 56 | fuel selection lever |
| 58 | nodal point |
| 60 | feedback amplification |
| 62 | starting compensation |

What is claimed is:

1. A fill level measuring system for determining liquid content of a tank comprising:
   a fill level sensor for generating a first signal proportional to a height of a point of a liquid level,
   at least one volume flow sensor for generating a second signal proportional to an inflow or outflow,
   a low-pass filter having a low-pass filter time constant,
   a high-pass filter having a high-pass filter time constant that is substantially identical to said low-pass filter time constant, and
   an indicating instrument,
   wherein said first signal is directed through said low-pass filter and said second signal is directed after integration through said high-pass filter, and said first signal and said second signal are summed up before said indicating instrument.

2. A fill level measuring system according to claim 1, further comprising a means for bridging said low-pass filter.

3. A fill level measuring system for determining liquid level of a tank comprising:
   a fill level sensor for generating a first signal proportional to a height of a point of a liquid level,
   at least one volume flow sensor for generating a second signal proportional to an inflow or outflow, and
   an indicating instrument,
   wherein said first signal is used as a support value for a gauging filter that has an integrator adjacent to an input of which is a difference from said second signal generated by said volume flow sensor and a returned correction signal that is proportional to a difference between a momentary signal generated by said fill level sensor and an output of said integrator as an estimated value.

4. A fill level measuring system according to claim 3, wherein said fill level sensor has a potentiometer and a float attached to said fill lever sensor.

5. A fill level measuring system according to claim 3, wherein said volume flow sensor is a turbine wheel meter.

6. A fill level measuring system according to claim 4, wherein said potentiometer has a linearity deviation of 5 to 30%.

7. A fill level measuring system according to claim 1, wherein said volume flow sensor is a hot-wire anemometer.

8. A fill level measuring system according to claim 1, further comprising a plurality of tanks and a plurality of feed pipes, wherein said at least one volume flow sensors include a plurality of volume flow sensors, each of said plurality of volume flow sensors is associated with one said feed pipe wherein said second signal of each of said volume flow sensors are combined as a sum signal.

9. A fill level measuring to claim 1, wherein said low-pass filter and said high-pass filter are digitally constructed.

10. A fill level measuring system according to claim 2, wherein said means for bridging said low-pass filter bridges said low-pass filter before starting and produces a mean value of signal supplied by said fill level sensor.

11. A fill level measuring system according to claim 3, wherein said gauging filter has a feedback branch that can be set to different amplification factors.

12. A fill level measuring system according to claim 1, wherein a liquid content of said tank determined from said first signal and said second signal are used to calculate a range.

* * * * *